Aug. 18, 1959  E. C. MILLER  2,900,334
FRACTIONATOR INDICATING AND CONTROL METHOD
Filed July 18, 1955  2 Sheets-Sheet 1

INVENTOR.
E.C. MILLER
BY
Hudson & Young
ATTORNEYS

United States Patent Office 2,900,334
Patented Aug. 18, 1959

2,900,334

FRACTIONATOR INDICATING AND CONTROL METHOD

Elmer C. Miller, Bartlesville, Okla., assignor to Phillips Petroleum Company, a corporation of Delaware Application July 18, 1955, Serial No. 522,681

3 Claims. (Cl. 208—350)

This invention relates to a method of analyzing the operation of a fractionation column and controlling such column.

In making many separations by fractionation, particularly in the fractionation of crude oil and cracked products, serious difficulties are encountered when small quantities of heavy material appear in the overhead stream. Even small quantities of heavier material may seriously upset the operation of subsequent fractionators operating on the overhead product of the first fractionator. In particular, in a debutanizer column, where normal and isobutane together with lighter materials are taken overhead and thereby separated from pentane and heavier materials, the presence of pentane in the overhead product requires that a more expensive and better separation be made in the following column where the overhead is fractionated. This difficulty is accentuated where high purity products are being made from the overhead stream. The same difficulty exists in making other separations, as in the separation of $C_7$ and $C_8$ hydrocarbons from $C_8$ hydrocarbons and heavier materials.

In accordance with this invention, the column is controlled efficiently to process the maximum amount of material and yet prevent heavier components from appearing in the overhead stream. This is effected by comparing the refractive indices of (a) the overhead product or a sample taken at a few trays below the top of the column and (b) a sample withdrawn from a tray below that from which sample (a) is withdrawn, and between the feed tray and the tray from which sample (b) is withdrawn. With such a comparison, changes in the amount of the light components have substantially no effect upon the refractive indices but the presence of heavier materials near the top of the column produces a substantial difference in the refractive indices of the two samples permitting the column to be rapidly adjusted to eliminate the heavier material from the overhead stream.

It is an object of the invention to provide an improved method of controlling a fractionator.

It is a still further object to provide an improved system of column control wherein a pair of samples from different regions of the column have their refractive indices compared, the resultant output being used for automatic control of the column.

It is a still further object to permit maximum loading of a fractionation column without impairing the composition of the overhead or kettle product.

Various other objects, advantages and features of the invention will become apparent from the following detailed description taken in conjunction with the accompanying drawings, in which.

Figure 1:
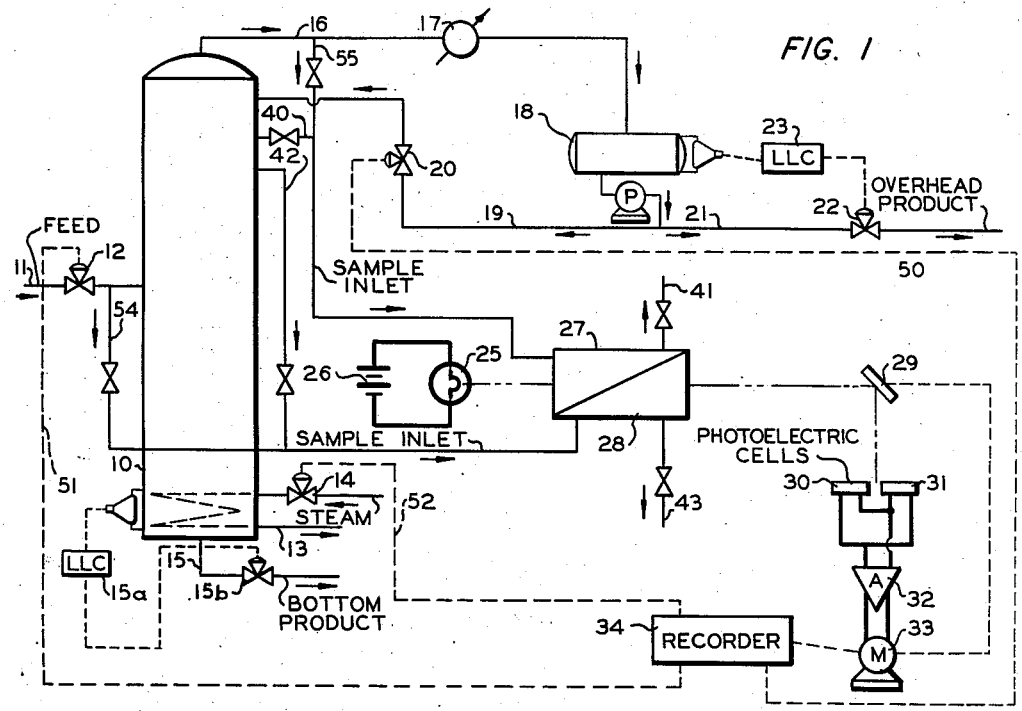
Figure 1 is a flow diagram illustrating the control system of the invention as applied to a fractionation column.

Referring now to Figure 1, I have shown a fractionator 10 to which material to be separated is fed through a feed line 11, the flow of material through which is controlled by motor valve 12. The fractionator can be of the bubble tray type, or a packed column.

Heat is supplied to the bottom of the column through a steam line 13, the flow being controlled by a motor valve 14. It will be understood that motor valve 14 is representative of any suitable control for regulating the amount of heat supplied to the bottom of the column.

The bottom product is withdrawn through a valved line 15 under the control of a level sensing unit 15a and the top product is withdrawn through a line 16 which extends through a condenser 17 to an overhead accumulator 18.

A portion of the overhead material from accumulator 18 is fed to the top of the column as reflux through a line 19, flow through which is controlled by an automatic motor valve 20. Overhead product leaves the accumulator through a line 21, flow through which is controlled by a motor valve 22 which, in turn, is actuated by a liquid level controller 23 connected to the accumulator 18.

The system of the invention will be described in connection with the operation of a debutanizer column, the concentration gradients of the materials present being shown in Figure 2. As will become apparent, hereinafter, the control system of the invention is applicable to other separations of hydrocarbon materials. In this particular separation, the column can be operated at a pressure of 145 to 150 pounds per square inch gauge with a top temperature of 150° F. and a bottom temperature of 285° F.

Figure 2:
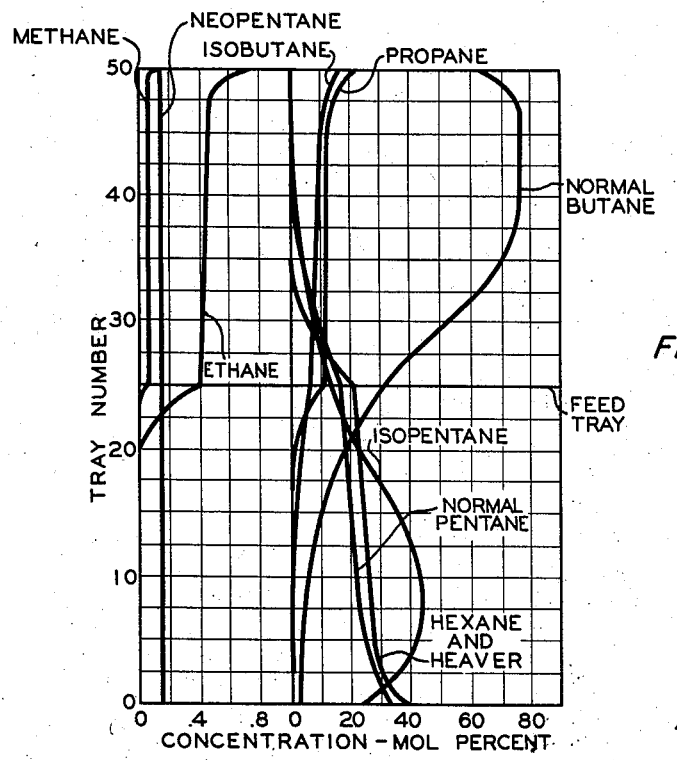
Figure 2 is a graph illustrating a separation to be controlled.

As will be apparent in Figure 2, in making this separation, the feed, overhead and bottom streams have the following compositions. Fifty bubble cap trays are utilized in the column.

| Overhead product: | Mol percent |
|---|---|
| Normal butane | 59.9 |
| Propane | 23.0 |
| Isobutane | 16.0 |
| Ethane | .8 |
| Methane | .1 |
| Neopentane | .2 |
| | 100.0 |

| Feed: | Mol percent |
|---|---|
| Normal butane | 30.0 |
| Hexane and heavier | 22.0 |
| Normal pentane | 17.0 |
| Isopentane | 13.0 |
| Propane | 10.2 |
| Isobutane | 7.1 |
| Ethane | 0.4 |
| Neopentane | 0.2 |
| Methane | 0.1 |
| | 100.0 |

| Bottom product: | Mol percent |
|---|---|
| Hexane and heavier | 39.8 |
| Normal pentane | 33.0 |
| Isopentane | 24.0 |
| Normal butane | 3.0 |
| Neopentane | .2 |
| | 100.0 |

The refractive indices of certain of the above components are as follows:

| Hydrocarbon: | Index of refraction |
|---|---|
| Propane | 1.295 |
| Isobutane | 1.3186 |
| Normal butane | 1.3293 |
| Neopentane | 1.3472 |
| Isopentane | 1.3539 |
| Normal pentane | 1.3576 |
| Hexane | 1.3750 |

In accordance with the invention, a differential refractometer is connected to compare the refractive indices of two streams taken from selected locations in the column. This unit includes a radiation source 25, such as a source of visible light, which is supplied by a battery or other current source 26. A beam of radiation from this source passes through a cell 27 and a cell 28 to a movable or rotatable mirror 29 and, thence, to a pair of photoelectric cells or other radiation detectors 30 and 31. These photoelectric cells are connected in opposition to the input of an amplifier 32, the output of which is fed to a motor 33 having a rotatable shaft which is mechanically connected to the mirror 29 and to a recorder 34.

The motor 33 moves the mirror 29 so as to maintain the beam passing through the cells 27, 28 at a fixed location. The amount of rotation of the mirror 29 necessary to accomplish this is proportional to the difference in refractive indices of the materials in the cells 27 and 28. In accordance with the invention, a sample from the forty-seventh tray flows through a valved sample line 40 to the cell 27 and, thence, through an outlet 41 to suitable disposal, as desired. A second sample is withdrawn through a valved line 42 from a tray somewhat above the zone of feed introduction, say the fortieth tray. This sample is fed to the cell 28 from which it passes through a valved outlet line 43 to any suitable disposal system.

Upon consideration of the refractive indices of the components and the concentration gradients of Figure 2, as hereinbefore noted, it will be seen that the $C_5$ and heavier materials have a substantially different and higher index of refraction than the $C_4$ and lighter materials. Thus, changes in the amount of these lighter components, namely, propane, isobutane and normal butane will produce only a relatively small change in the total refractive index of the streams passing through the cells 27 and 28. In fact, if the samples are taken from the fortieth and forty-seventh trays, this change is practically zero since the concentration gradients of the lighter components are substantially vertical within this region. Moreover, the differences tend to balance out because they affect the samples fed to both cells of the instrument.

However, if the proportion of a heavier material, such as pentane, increases in the feed, a considerably larger change in refractive index is produced, and the refractive index of the material fed through line 42 to the cell 28 increases without a corresponding increase in the refractive index of the fluid passing through the cell 27. When this occurs, the motor 33 moves the mirror 29 to cause the beam to again be reflected to a position centrally of the photoelectric cells 30 and 31. The described rotation of the motor, in accordance with the invention, is utilized to open motor valve 20 and increase the amount of reflux to the fractionation column. This is indicated by dotted line 50 connecting the recorder 34 to the motor valve 20.

The increased reflux rate, in turn, increases the efficiency of the separation until the pentane present at the inlet of sample conduit 42 returns to its preassigned value whereupon the reflux rate is restored to its original value by action of the motor 33 and motor valve 20.

A similar control action can be effected by coupling the recorder 34 to motor valve 12. This connection is indicated by dotted line 51 and the action is to cause a decrease in feed rate when pentanes or heavier materials reach the sample line 42 and cause the index of refraction of the fluid in cell 28 to increase above that in cell 27. When, as a result of the reduced feed rate, the refractive index of the fluid at the sample line 42 returns to its preassigned value, the motor valve is automatically actuated to restore the column to its previous condition.

In still another aspect of the invention, the recorder 34 is connected to the motor valve 14, this connection being indicated by dotted line 52. In this instance, an increase in refractive index at sample line 42, due to the presence of excessive amounts of pentane, causes the amount of heat added to the column to be decreased until the efficiency of the separation is such that the stream fed to cell 28 has the desired refractive index in comparison with that of the overhead product. It will be understood that only one of the valves 12, 14 or 20 is controlled by the recorder 34 at any one time, the valves not being controlled having rate of flow controllers, or being controlled manually or in any other suitable manner.

In some separations, the comparison can be made with a sample of the feed, which can be fed to the cell 28 through a valved line 54. That is, the location of the sample line feeding cell 28 is variable depending upon the separation to be made and the concentration gradients existing through the column. The position of the sample line 42 is described in the appended claims as being below the upper sample line and substantially above the kettle. By substantially above the kettle, I mean at least 40 percent of the number of trays from the kettle of the column. If a packed column were employed, the location would be 40 percent of the distance from the kettle to the top of the column. Thus, in the present example, where a 50 tray fractionator is used, the expression "substantially above the kettle" means that the sample line is attached to the 20th tray or some higher tray in the fractionation unit. The expression below the upper sample line means at least 1 tray below this line.

Similarly, depending upon the concentration gradients within the column and the nature of the separation desired, the location of the upper sample line 40 can be varied. For example, the sample for cell 27 can be withdrawn through a valved line 55 from the overhead product line. When, in the appended claims, I describe the upper sample line as being connected substantially at the top of the column, I mean that this line is attached either to the overhead line or within the upper 20 percent of the trays in the fractionation column. Thus, with the 50 tray column described, the sample line 40 can be located any place above the 40th tray.

In making the particular separation shown in the specific example, best results are obtained where the sample lines 40 and 42 are both attached at a region where the concentration gradients of the lighter components are substantially vertical (i.e., between the 35th and 48th trays) the upper sample line being located where substantially no heavier component is present (i.e., between the 42nd and 48th trays), and the lower sample line located where some of the heavier components are present (i.e., between the 35th and 42nd trays).

Thus, generally speaking, in one important aspect of the invention, both samples are withdrawn from a region wherein there is little or no change in the concentration of one or more selected components, but where there is a change in the concentration of another component or set of components. This difference in refractive index, then, can be used to control the column so as to maintain an equal difference in concentration between the second set of components at the two regions of sample withdrawal, and the control action will not be interfered with by changes in the amount of the first component or set of components, since such changes will have an equal or substantially equal effect on the refractive index of both samples.

The invention is also applicable to a separation system where the feed consists essentially of $C_7$ and $C_8$ hydrocarbons together with heavier oils. In this fractionator, which is operated at a pressure of 21–24 pounds per square inch gage, a top temperature of 267° F. and a bottom temperature of 345° F., the overhead product consists substantially of $C_7$ and $C_8$ hydrocarbons while the kettle products consists essentially of $C_8$ hydrocarbons and heavier oils. In making this separation, the cell 28 is preferably connected to the feed inlet line and the sample cell 27 is preferably connected about 5 trays below the top of the column, although it can also be advantageously connected to the overhead withdrawal line.

Thus, it will be apparent that the separation system has general application to the separation of hydrocarbons in a fractionator, although very valuable and useful results are obtained in the specific debutanizer operation herein described in detail. Thus, due to the specific connection of the sample cells as described herein, the lighter components which have relatively small indices of refraction, have little or no effect upon the output of the instrument, whereas the instrument is extremely sensitive to the presence of heavier materials in the upper part of the column.

It will be evident that the column thus operates at maximum throughput for the particular feed composition entering the fractionator while the presence of even traces of heavier material in the overhead product can be automatically and efficiently effected through the described differential control action.

Figure 3:
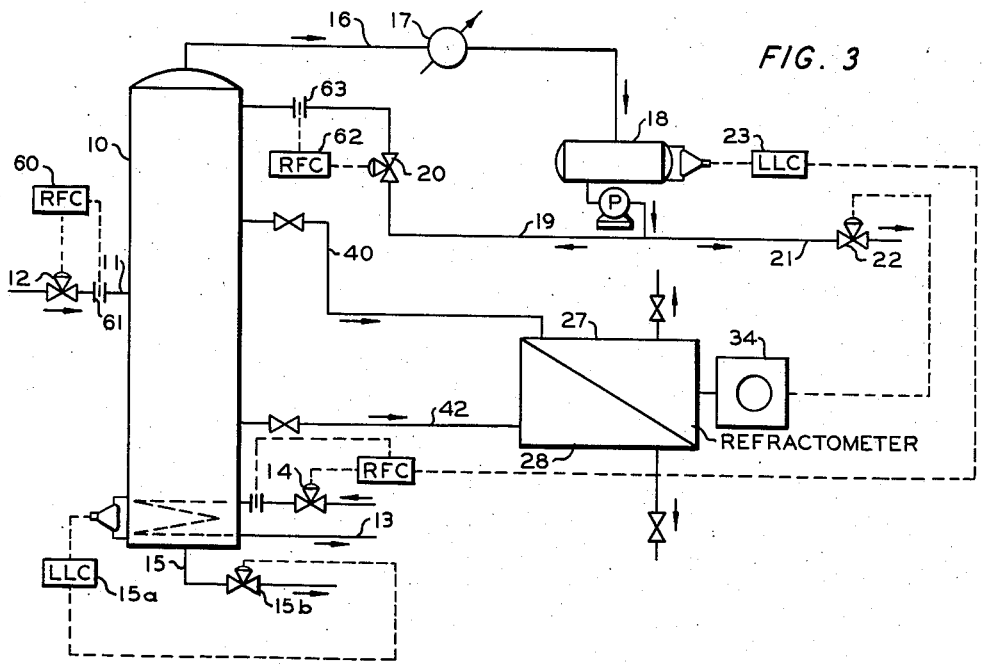
Figures 3 and 4 are modifications illustrating different control systems constructed in accordance with the invention.

Referring now to Figure 3, I have shown a modified control system wherein parts similar to those of Figure 1 are indicated by like reference numerals. In this modification, feed enters the column 10 at a controlled rate, as determined by the setting of a rate of flow controller 60 having a sensing element in the feed line 11 downstream of the valve 12. Also, reflux is fed to the column at a constant rate as determined by the setting of a rate of flow controller 62 controlling the valve 20 and having a sensing element 63 in the reflux line 19 downstream of the valve 20. In this modification, the differential refractometer controller operates the motor valve 22 controlling the rate of withdrawal of overhead product, while the liquid level controller 23 on the accumulator 18 controls the rate of steam fed to the bottom of the column. Thus, the controller 23 ensures that sufficient heat is supplied to the column to maintain a preset level in the accumulator 18, so that reflux is always available. The separation is advantageously controlled, as described previously, by the differential refractometer and its associated controller.

Figure 4:
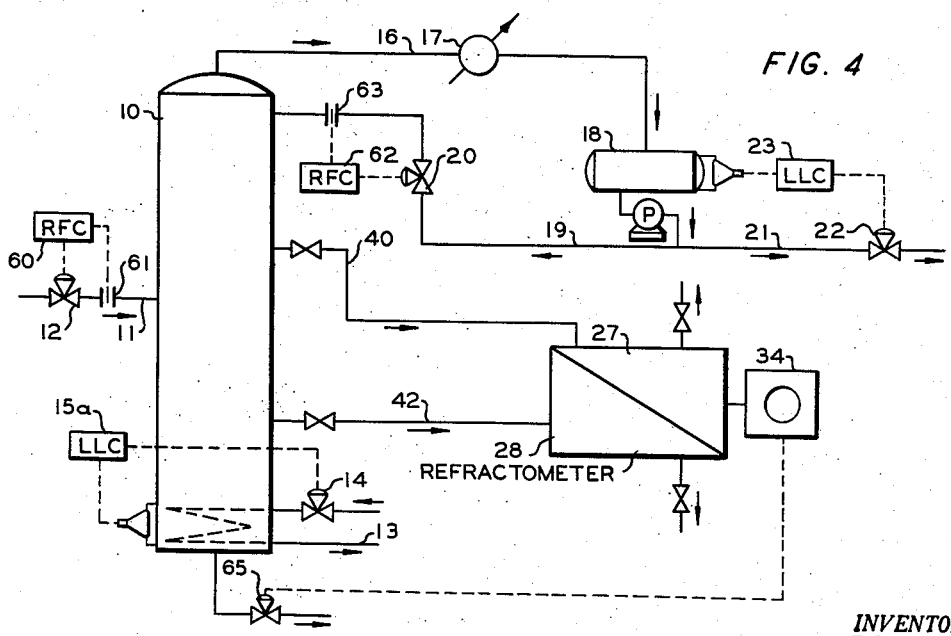

In Figure 4, the liquid level controller 15a controls the valve 14 to maintain a proper heat supply to the bottom of the column, and ensure that liquid material is always present in the kettle of the column. The output of the differential refractometer unit is utilized to control a valve 65 regulating the rate of kettle product withdrawal. In this manner, operation of the column is controlled as described in connection with Figure 1 by the differential refractometer unit while the liquid level controller cooperates in the combination to ensure that liquid is always present in the column kettle.

While the invention has been described, in connection with present, preferred embodiments thereof, it is to be understood that this description is illustrative only and is not intended to limit the invention.

I claim:

1. In a fractionation system wherein the efficiency of separation is controlled by adjustment of an operating variable, the steps which comprise continuously withdrawing samples from two spaced locations in the fractionation column, passing a beam of radiation capable of being refracted sequentially through the two samples, whereby said beam is deflected in accordance with the relative refraction indices of the two samples, producing an output representative of such deflection, controlling said operating variable to maintain said deflection at a constant preselected value, said spaced locations both being at a region where there is substantially no variation in the concentration gradients of the components present in the overhead product, the upper location being at a region normally free from heavy components present in the bottom product, the lower location being at a region normally containing appreciable amounts of such components.

2. The process of claim 1 wherein said operating variable is the overhead take-off rate.

3. In a fractionation system for fractionating a feedstream comprising first and second components wherein the efficiency of separation is controlled by adjustment of an operating variable, the steps which comprise continuously withdrawing samples from two spaced locations in the fractionation column, passing a beam of radiation capable of being refracted sequentially through the two samples, whereby said beam is deflected in accordance with the relative refractive indices of the two samples, producing an output representative of such deflection, controlling said operating variable to maintain said deflection at a constant preselected value, said spaced locations both being at a region where there is substantially no variation in the concentration of said first component between said locations and where there is a substantial difference in the concentration of said second component between said locations.

References Cited in the file of this patent

UNITED STATES PATENTS

| | | |
|---|---|---|
| 2,529,030 | Latchum | Nov. 7, 1950 |
| 2,580,651 | Boyd | Jan. 1, 1952 |
| 2,583,973 | Stamm et al. | Jan. 29, 1952 |
| 2,724,304 | Crawford | Nov. 22, 1955 |
| 2,764,536 | Hutchins | Sept. 25, 1956 |